United States Patent [19]

Adams, Sr. et al.

[11] Patent Number: 5,224,664
[45] Date of Patent: Jul. 6, 1993

[54] ADAPTIVE CONTROL SYSTEM INPUT LIMITING

[75] Inventors: Don L. Adams, Sr., Fairfield; Stuart C. Wright, Woodbridge; David J. Verzella, Guilford; Troy J. LaMontagne, Wallingford, all of Conn.

[73] Assignee: United Technologies Corporation, Hartford, Conn.

[21] Appl. No.: 733,793

[22] Filed: Jul. 22, 1991

[51] Int. Cl.$^5$ .............................................. B64C 27/57
[52] U.S. Cl. ................................ 244/17.13; 244/194; 91/364; 318/563; 318/566; 416/35
[58] Field of Search ............... 244/17.11, 17.13, 76 R, 244/175, 177, 178, 181, 191, 192, 194, 195, 230; 318/563, 566, 626; 416/31, 35; 91/364, 363 A, 361, 411 A

[56] References Cited

U.S. PATENT DOCUMENTS

| | | | |
|---|---|---|---|
| 3,201,675 | 8/1965 | Curran et al. | 318/566 |
| 3,390,612 | 7/1968 | Wills | 91/364 |
| 3,390,614 | 7/1968 | Tatum | 318/563 |
| 3,429,376 | 2/1969 | Hohenemser | 416/35 |
| 3,938,762 | 2/1976 | Murphy | 244/17.13 |
| 4,078,750 | 3/1978 | Tomlinson | 244/194 |
| 4,094,481 | 6/1978 | De Walt | 318/566 |
| 4,133,250 | 1/1979 | Heintz | 91/364 |
| 4,305,028 | 12/1981 | Kostar et al. | 318/566 |
| 4,358,989 | 11/1982 | Tordenmalm | 91/364 |
| 4,599,698 | 7/1986 | Fischer et al. | 244/194 |
| 4,834,318 | 5/1989 | Taylor et al. | 244/17.13 |
| 4,866,361 | 9/1989 | Donley et al. | 318/566 |

Primary Examiner—Galen Barefoot
Attorney, Agent, or Firm—Gerald L. DePardo

[57] ABSTRACT

A control system, having an input command signal and driving a prime mover, is provided with variable magnitude and/or rate input signal limiting that is adjusted by maps 68,70,72,74 which set the limits for a variable magnitude limiter 14 and a variable rate limiter 22 as a function of the prime mover rate. The limiting is adjusted dynamically as the prime mover rate changes. When the prime mover enters an undesirable operating condition, the maps only limit the command signal in the direction of such condition. The adjustable limiting is enabled or disabled based on the position, rate, and/or acceleration of the prime mover.

8 Claims, 2 Drawing Sheets

ADAPTIVE CONTROL SYSTEM INPUT LIMITING

TECHNICAL FIELD

This invention relates to control system input limiting and more particularly to limiting control system inputs based on the status of a prime mover driven by the control system.

BACKGROUND ART

It has become common practice to control the mechanical aerodynamic flight surfaces of an aircraft, such as a helicopter, with an electronic control system. Operator (pilot) inputs are typically provided by position or force transducers which provide electrical or optical signals, proportional to the movement of, or force on, an input stick, to the control system. The outputs of such electronic systems typically drives 4 electrohydraulic actuators or prime movers, one for each of the 4 main axes of the helicopter, i.e., pitch (longitudinal cyclic), roll (lateral cyclic), collective, and yaw. Three of the actuators are mechanically linked through a "mixer" to the swashplate (which controls the main rotor blades) and one is linked to the tail rotor.

Typically, the design of such control systems use feedback signals, e.g., velocity (speed), acceleration, altitude, attitude, and angular rate, from various sensors to provide negative feedback for closed loop operation or to change gains or break-point frequencies to affect control system loop response. However, these control design techniques do not provide avoidance of excessive output overshoots, which can be caused by excessive operator commands. For example, along the longitudinal axis of a helicopter, if the rotor blade tip path plane (which determines vehicle pitch attitude) approaches the front or rear of the fuselage in a rapid manner, the rotor blades may overshoot and strike the fuselage causing severe damage. This problem is exacerbated by modern systems that tend to isolate the pilot input stick command from the actual system command.

In purely mechanical systems employing mechanical input levers and pedals having displacements related to the positions of the output actuators, this problem is less likely to occur because there is a direct relationship between the position of the input levers and the real flight commands and outputs. Furthermore, in mechanical systems there is built-in damping and slew rate limiting based on the time constant of the inertia of the thing being controlled, thus, adding more "feel" to the input lever. Similarly, for a system employing an electrical input command signal proportional to lever position, there is also less isolation because the pilot always knows the position of the swashplate by the position of the lever.

It is known that a side-arm controller such as that described in U.S. Pat. No. 4,420,808, allows the pilot to control all 4 axes of the aircraft with a single input stick. The controller comprises a limited travel (approx 0.25 in) control grip stick which provides inputs for all axes to the electronic control system by sensing a force applied to the stick in a given direction using strain gauge sensors. Typically, the force applied to the stick is proportional to a rate command, i.e., a rate of change in the loop reference, along a given control axis, e.g., deg/sec for vehicle pitch attitude. When no force is applied to the stick, the rate command is zero, the loop reference is fixed, and the control system holds all the vehicle axes at the current reference settings.

Because the inertia of the control grip of the side-arm controller is negligible and the input stick position relates to a rate of change command rather than, say, a position command, it is possible for the pilot to inadvertently command a high rate of change (slew rate) causing the output actuator to be driven into an undesirable operating region. This occurs because the input lever position does not relate directly to real air-vehicle output position of the swashplate and tail rotor blade pitch. Thus, the pilot can easily lose the "feel" of the actual command to, and output position of, the system (swashplate and tail rotor).

This is particularly a problem for axes which exhibit an inertial time lag between the pilot command and the aircraft response, e.g., pitch attitude, which can cause the pilot to make a larger input than is necessary.

DISCLOSURE OF THE INVENTION

Objects of the invention include provision of automatic limiting of input commands to a control system which provides magnitude and/or rate limiting of such commands, which dynamically adjusts the amount of limiting based on operating regime, and which avoids output excursions which go beyond desireable bounds.

According to the present invention, magnitude and/or rate limits of an input command are adjusted as a function of the status of a desired output parameter, such as a prime mover, driven by the control system. The invention monitors position, rate (i.e., rate of change of position), and/or acceleration of the prime mover to determine when the prime mover is approaching an undesirable operating regime. When an undesirable operating regime is detected, the input is variably limited as a function of prime mover rate, only in the direction to avoid such undesirable operating regime. When the prime mover is within the desirable operating regime and not heading for an undesirable regime, the operator input limits are set at wide margins and are fixed, thereby not impeding the normal operator authority.

The invention represents a significant improvement over previous control techniques by providing continuous monitoring of the prime mover and limiting the pilot's input command if the prime mover approaches a undesired limit. Thus, this limiting technique allows the authority required in normal operation (i.e., the limits are essentially transparent to the pilot) while providing a critical safety enhancement to the control system by simply adding a feedback signal and minimal logic. The invention, in effect, implements an overseeing role which acts similar to that of a safety pilot by limiting, in response to the status of various system outputs, the operator's authority to command the control system.

The foregoing and other objects, features, and advantages of the present invention will become more apparent in light of the following detailed description of exemplary embodiments thereof, as illustrated in the accompanying drawings.

BEST MODE FOR CARRYING OUT THE INVENTION

Figure 1:
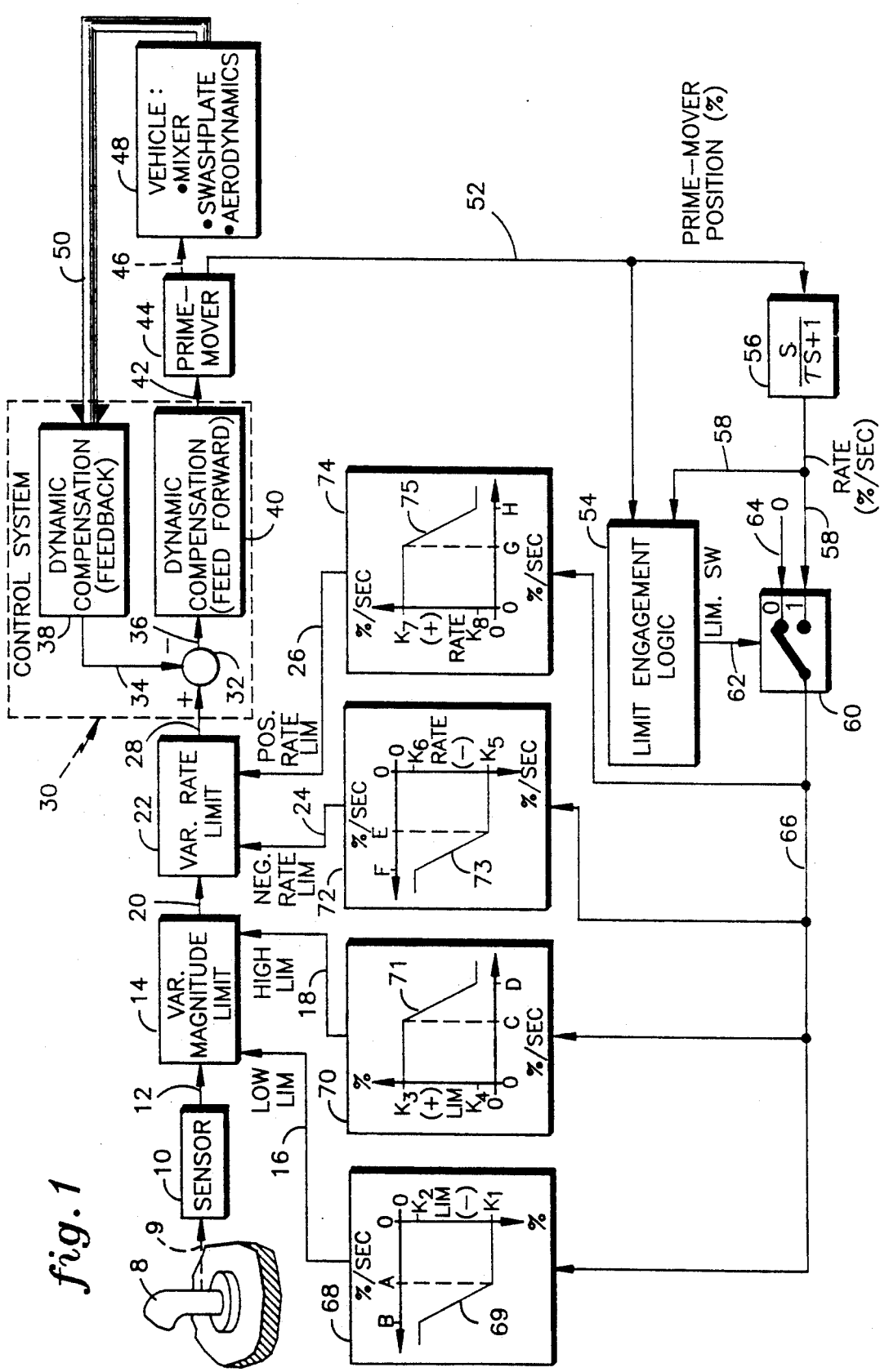
FIG. 1 is a schematic block diagram of a control system having prime mover feedback and input command limiting for one control axis of a vehicle in accordance with the present invention.

Referring to FIG. 1, adaptive control system input limiting includes an operator (or pilot) input stick 8 connected by a mechanical linkage 9, to an input sensor 10, such as a position or force transducer, which measures the stick 8 movement. The sensor 10 provides an electronic or optical signal indicative of the operator's input command, on a line 12 to a known variable magnitude limiter 14. The variable magnitude limiter 14 includes known electronic hardware such as op-amps, diodes, and resistors, arranged to provide an output signal on a line 20, related to the input signal on the line 12, having a minimum limit defined by the signal on a line 16 and a maximum limit defined by the signal on a line 18. When the magnitude of the signal on the line 12 is within the magnitude limits set by the signals on the lines 16,18, the output signal of the variable magnitude limiter 14 is the same as the input signal on the line 12. If the magnitude of the signal on the line 12 exceeds the minimum or maximum limits set by signals on the lines 16,18, respectively, the magnitude of the output signal on the line 20 is limited (clamped) to the minimum or maximum limit value, respectively, until the input no longer exceeds the limit.

The output signal on the line 20 is provided to a variable rate limiter 22 which includes known electronic hardware, such as op-amps, diodes, and resistors, arranged to provide a signal on a line 28, related to the signal on the line 20, having a negative (decreasing) rate not greater than that defined by the magnitude of the signal on the line 24 and having a positive (increasing) rate not greater than that defined by the magnitude of the signal on the line 26. When the rate of change of the signal on the line 20 is within the two limits set by the signals on the lines 24,26, the output signal of the variable rate limiter 22 is the same as the input signal on the line 20. If the rate of the signal on the line 20 exceeds the negative or positive rate limit threshold set by the signals on the lines 24,26, respectively, the rate of the output signal on the line 28 is limited (clamped) to the negative or positive rate limit value, respectively, until the input rate no longer exceeds the limit. Thus, the variable rate limiter 22 mimics the input but prevents the rate of change of the output signal from exceeding certain positive and negative rates of change.

The signal on the line 28 is provided to a known control system 30 which typically comprises a summing junction 32 to which is fed a feedback signal on a line 34 and the magnitude and rate limited reference command signal on the line 28. More than one feedback signal may be used if desired. Known feedback dynamic compensation 38 provides the feedback signal on the line 34. The summing junction 32 provides an error signal on a line 36 representing the difference between the reference and the feedback signal. The error signal on the line 36 is fed to feed-forward dynamic compensation logic 40 which provides an output drive signal on a line 42 to a known prime mover 44. The feedback and feedforward dynamic compensations 38,40, respectively, typically comprise gains, lead-lags, and other functions for shaping time and/or frequency response of the system, or state-space matrices representing differential equations for shaping the same. Other arrangements of and additional dynamic compensation may be used if desired.

For a helicopter, the prime mover 44 is typically one of several electro-hydraulic actuators, each corresponding to a different control axis of the helicopter, e.g., pitch attitude. The prime mover is connected by a mechanical linkage 46 which drives the actual system to be controlled, e.g., the helicopter swashplate. If the longitudinal axis of a helicopter (i.e., the pitch attitude of the vehicle) were controlled by the control loop 30, the output signals from the vehicle 48 would typically be attitude (pitch), attitude rate, forward velocity, altitude, and ambient temperature, all of which would be fed-back on a plurality of lines 50 to the dynamic feedback compensation logic 38 of the control system 30.

The position of the prime mover is determined by a position sensor which provides an electrical signal indicative of the position of the prime mover on the line 52 to a limit engagement logic 54 and a derivative lag 56. The derivative lag 56 provides a signal indicative of the rate of change with respect to time of the prime mover on a line 58 to the limit engagement logic 54 and a switch 60. The lag time constant $\tau$ is set at a value, e.g., 0.1 second, to reduce the high frequency noise caused by the derivative.

The limit engagement logic 54 (described hereinafter) provides an output signal (LIMSW) on a line 62 to the switch 60 which selects either a 0 magnitude signal (when LIMSW=0) on a line 64 or the prime mover rate (when LIMSW=1) from the derivative lag 56 on the line 58. The switch provides an output signal on a line 66 to a low magnitude limit map 68, a high magnitude limit map 70, a negative rate limit map 72, and a positive rate limit map 74. When LIMSW is set to 0, the signal on the line 66 is 0 and the limit maps are disabled (as described hereinafter), and when LIMSW is set to 1, the limit maps respond to the prime mover rate signal on the line 58. The limit maps 68,70,72,74 contain known electronic hardware, such as op-amps, diodes, and resistors, arranged to create "function generators" that linearly interpolate between breakpoints to provide output signals indicated by the curves 69,71,73,75, in response to the rate signal on the line 66.

The low magnitude limit map 68 provides a low magnitude limit signal on the line 16 to the variable magnitude limiter 14 as a function of the rate signal on the line 66 and the shape of the curve 69. When the rate signal is near 0%/sec, the low limit is set to a maximum value K1, e.g., −50%, which is below the normal minimum operator command. As the rate signal on the line 66 increases in the negative direction to a breakpoint A, e.g., −60%/sec, indicating a decreasing prime mover position signal on the line 52, the low limit signal increases linearly to a minimum value K2, e.g., −10%, at a breakpoint B, e.g., −76%/sec. Consequently, the maximum negative value the operator can command decreases as the prime mover rate increases. Other shapes, more breakpoints, and different maximum or minimum values may be used if desired.

Similarly, the high magnitude limit map 70 provides a high magnitude limit signal on the line 18 to the variable magnitude limiter 14 as a function of the rate signal on the line 66. When the rate signal on the line 66 is near 0%/sec, the high magnitude limit is set to a value K3, e.g., 50%, higher than the normal command range. When the rate signal exceeds the value corresponding to a breakpoint C, e.g., 60%/sec, the high magnitude limit decreases linearly to a value K4, e.g., 10%, at a breakpoint D, e.g., 76%/sec. Consequently, the maximum positive value the operator can command decreases as the prime mover rate increases. Other shapes, more breakpoints, and different maximum or minimum values may be used if desired.

The negative rate limit map 72 provides a negative rate limit signal on the line 24 to the variable rate limiter 22 as a function of the rate signal on the line 66 and the shape of the curve 73. When the rate signal on the line 66 is near 0%/sec, the negative rate limit is set to a value K5, e.g., −50%/sec, higher than a rate the pilot would normally command. When the rate signal limit decreases linearly to a value K6, e.g., −10%/sec, at a breakpoint F, e.g., −75%/sec. Consequently, the maximum negative rate the operator can command decreases as the prime mover rate increases. Other shapes, more breakpoints, and different maximum or minimum values may be used if desired.

Similarly, the positive rate limit map 74 provides a positive rate limit signal on the line 26 to the variable rate limiter 22 as a function of the rate signal on the line 66 and the shape of the curve 75. When the prime mover rate is near 0%/sec, the positive rate limit is set to a value K7, e.g., 50%/sec. When the rate exceeds a breakpoint G, e.g., 60%/sec, the limit decreases linearly to a value K8, e.g., 10%/sec, at a breakpoint H, e.g., 75%/sec. Consequently, the maximum positive rate the operator can command decreases as the prime mover rate increases. Other shapes, more breakpoints, and different maximum or minimum values may be used if desired.

When the limit engagement logic 54 commands the signal LIMSW to 0, the switch 60 connects a signal having a fixed magnitude of 0 on the line 64, to the line 66, thereby preventing the limit maps 68,70,72,74 from reacting to changes in prime mover rate signal on the line 58 by keeping the limits fixed at the values K1,K3,K5,K7, outside normal pilot commands.

Figure 2:
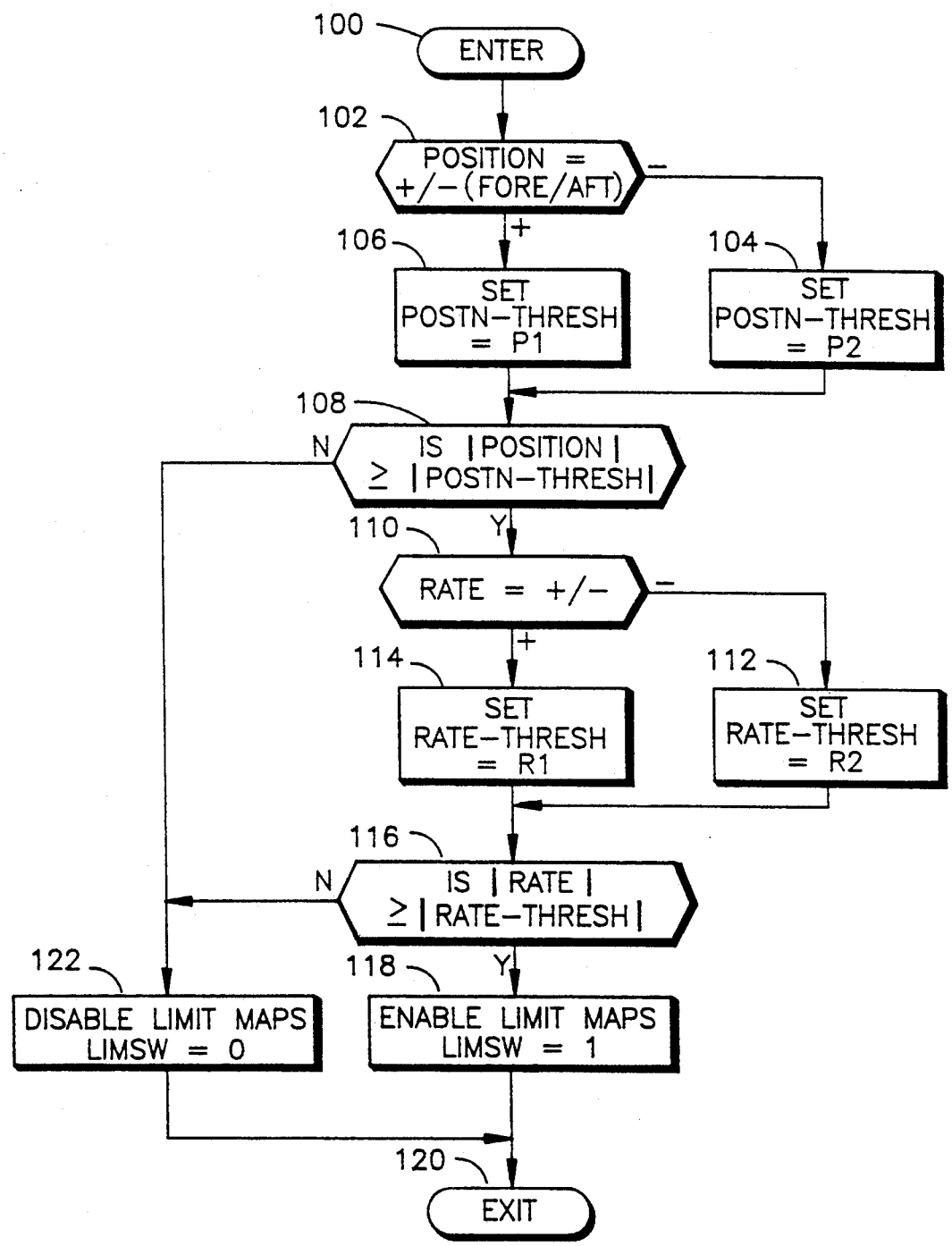
FIG. 2 is a logic flow diagram illustrating steps to enable and disable the response of limit maps to prime mover rate in accordance with the present invention.

Referring now to FIG. 2, the limit engagement logic 54 begins at an entry point 100, and a step 102 determines the direction or sign of the prime mover position from the signal on the line 52. If the position is positive (or fore of the aircraft for the pitch control loop), a step 104 sets a prime mover position threshold POSTN-THRESH equal to a value P2, e.g., −10%. Otherwise, a step 106 sets the position threshold POSTN-THRESH to a value P1, e.g., 10%. Then a test 108 determines if the absolute value of the prime mover position is greater than or equal to the absolute value of the position threshold POSTN-THRESH. If it is, a test 110 determines if the rate of change of the prime mover is negative by monitoring the sign of the rate signal on the line 58. If the rate is negative, a step 112 sets a prime mover rate threshold RATE-THRESH equal to a value R2, e.g., −30%/sec, otherwise a step 114 sets the rate threshold RATE-THRESH to a value R1, e.g., 30%/sec. Next, a test 116 determines if the absolute value of the prime mover rate is greater than or equal to the absolute value of the rate threshold RATE-THRESH. If it is, the signal LIMSW on the line 62 is commanded to a logic 1 by a step 118 which causes the switch 60 to connect the line 58 to the line 66. If the result of the test 108 or the test 116 is no, a step 122 prevents the limit maps from reacting to prime mover status by setting the signal LIMSW on the line 62 to 0. This commands the position of the switch 60 to connect the line 64, having a 0 signal magnitude, to the line 66, thereby setting all the limit maps to their widest margin, i.e., K1,K3,K5,K7. The logic is then exited from a point 120.

The limit engagement logic 54 may likely be implemented in software in realtime. The update rate of the logic will be, e.g., 80 Hz, and must be sufficiently fast enough to detect a prime mover rate of change and to limit the input so as to prevent over stressing of the prime mover or prevent the prime mover from entering an undesirable region. Other update rates may be used if desired.

Although the invention has been described as being implemented on a helicopter, the invention will work equally well in any control system that has an output parameter which requires limiting in certain operating regimes and has an input command signal related to that output.

Furthermore, instead of the prime mover being a mechanical position derived from a position sensor, it may also be an intermediate parameter in the software control algorithm that relates to a real world parameter that requires limiting.

Also, the variable magnitude limiter 14, low magnitude limit map logic 68, high magnitude limit map logic 70, variable rate limiter 22, negative rate limit map logic 72, positive rate limit map logic 74, switch 60, derivative lag 56 and limit engagement logic 54 may preferably be implemented as one of many functions performed by the software of an electronic control system such as that described in U.S. Pat. No. 4,270,168.

If different limiting profiles are desired for various position regimes, more maps and switches may be used and the enable logic 54 may be modified to enable the desired maps at the desired conditions. Also, instead of linearly interpolating maps, equations may also be used to determine the limit values.

Still further, the invention will work equally well if the limit maps 68,70,72,74 are continuously responsive to prime mover rate. If that technique is chosen, the limit engagement logic 54 and the switch 60 need not be included and the line 58 is always connected to the line 66.

Instead of monitoring both rate and position of the prime mover to determine the condition to engage the limit maps, the invention will work equally well if the logic 54 only monitors position (i.e., the steps 110-116 need not be included). Furthermore, in addition to or instead of monitoring rate and/or position of the prime mover, the acceleration of the prime mover may be monitored by the logic 54.

Instead of using both a variable magnitude limiter and a variable rate limiter, the invention will work equally well using either a magnitude limiter or a rate limiter individually.

Although the invention has been described and illustrated with respect to exemplary embodiments thereof, it should be understood by those skilled in the art that the foregoing and various other changes, omissions and additions may be made without departing from the spirit and the scope of the invention.

We claim:

1. An adaptive control system input limiter, comprising:
    a control system providing output drive signals in response to an input command signal indicative of the desired output of said control system;
    a prime mover, responsive to said output drive signals from said control system;

an input limiter, responsive to the status of said prime mover, for limiting at least one parameter of said input command signal to a predetermined value when said status of said prime mover approaches an undesirable operating condition, said limiting being solely along the direction of said undesirable operating condition, and said predetermined value being related to prime mover rate; and said input command signal being a percent pitch command for a helicopter.

2. Apparatus of claim 1 wherein said status of said prime mover is the position of said prime mover.

3. Apparatus of claim 1 wherein said status of said prime mover is the velocity of said prime mover.

4. Apparatus of claim 1 wherein said parameter of said input command signal is the magnitude of said input command signal.

5. Apparatus of claim 1 wherein said parameter of said input command signal is the rate of change of magnitude with respect to time of said input command signal.

6. Apparatus of claim 1 wherein said prime mover comprises an electro-hydraulic actuator controlling the pitch attitude axis of a helicopter.

7. Apparatus of claim 6 wherein said undesirable operating condition comprises a predetermined position of said electro-hydraulic actuator corresponding to a tip path plane near the fuselage of the helicopter.

8. Apparatus of claim 6 wherein said undesirable operating condition comprises a predetermined position of said electro-hydraulic actuator corresponding to a tip path plane near the fuselage of the helicopter and a predetermined rate of change of position with respect to time of said electro-hydraulic actuator corresponding to said tip path plane approaching the fuselage.

* * * * *